United States Patent
Hsiang et al.

(10) Patent No.: US 11,483,575 B2
(45) Date of Patent: Oct. 25, 2022

(54) CODING TRANSFORM COEFFICIENTS WITH THROUGHPUT CONSTRAINTS

(71) Applicant: MediaTek Inc., Hsinchu (TW)

(72) Inventors: Shih-Ta Hsiang, Hsinchu (TW); Tzu-Der Chuang, Hsinchu (TW); Ching-Yeh Chen, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/548,340

(22) Filed: Aug. 22, 2019

(65) Prior Publication Data

US 2020/0068206 A1    Feb. 27, 2020

Related U.S. Application Data

(60) Provisional application No. 62/735,927, filed on Sep. 25, 2018, provisional application No. 62/735,100, (Continued)

(51) Int. Cl.
*H04N 19/18* (2014.01)
*H04N 19/146* (2014.01)
(Continued)

(52) U.S. Cl.
CPC ............ *H04N 19/18* (2014.11); *H04N 19/13* (2014.11); *H04N 19/146* (2014.11); *H04N 19/70* (2014.11)

(58) Field of Classification Search
CPC ...... H04N 19/13; H04N 19/146; H04N 19/18; H04N 19/70; H04N 19/136
(Continued)

(56) References Cited

U.S. PATENT DOCUMENTS

| | | | |
|---|---|---|---|
| 2005/0038837 A1* | 2/2005 | Marpe | H03M 7/40 708/200 |
| 2012/0230418 A1* | 9/2012 | Sole Rojals | H04N 19/463 375/240.18 |

(Continued)

FOREIGN PATENT DOCUMENTS

| | | |
|---|---|---|
| CN | 103931188 A | 7/2014 |
| WO | WO 2013017092 A1 | 2/2013 |

(Continued)

OTHER PUBLICATIONS

Sze et al. (V. Sze and M. Budagavi, "High Throughput CABAC Entropy Coding in HEVC," in IEEE Transactions on Circuits and Systems for Video Technology, vol. 22, No. 12, pp. 1778-1791, Dec. 2012, doi: 10.1109/TCSVT.2012.2221526.) (Year: 2012).*

(Continued)

*Primary Examiner* — Christopher S Kelley
*Assistant Examiner* — Ana Picon-Feliciano
(74) *Attorney, Agent, or Firm* — Oblon, McClelland, Maier & Neustadt, L.L.P.

(57) ABSTRACT

A video coder that constrains the total number of regular bins used for entropy coding syntax elements of a current block is provided. The video coder entropy encodes or decodes the syntax elements selectively as either regular bins using context modeling or as bypass bins without context modeling. A constraint is specified to limit a total number of regular bins used for entropy coding the syntax elements of the current block. There may be no constraint limiting a number of regular bins specific to an individual syntax element of the current block.

13 Claims, 10 Drawing Sheets

Related U.S. Application Data filed on Sep. 22, 2018, provisional application No. 62/734,277, filed on Sep. 21, 2018, provisional application No. 62/722,237, filed on Aug. 24, 2018.

(51) Int. Cl.
*H04N 19/70* (2014.01)
*H04N 19/13* (2014.01)

(58) Field of Classification Search
USPC .......................................... 375/240, 240.02
See application file for complete search history.

(56) References Cited

U.S. PATENT DOCUMENTS

| | | | | |
|---|---|---|---|---|
| 2013/0027230 A1* | 1/2013 | Marpe | ................ | H04N 19/436 341/107 |
| 2013/0114676 A1* | 5/2013 | Guo | ................ | H03M 7/4037 375/240.02 |
| 2013/0177069 A1* | 7/2013 | Sze | ................ | H04N 19/70 375/240.02 |
| 2013/0182757 A1 | 7/2013 | Karczewicz et al. | | |
| 2013/0272424 A1* | 10/2013 | Sole Rojals | ........... | H04N 19/48 375/240.18 |
| 2013/0301738 A1* | 11/2013 | Kim | ................ | H04N 19/154 375/240.18 |
| 2014/0003530 A1* | 1/2014 | Sole Rojals | ......... | H04N 19/129 375/240.18 |
| 2014/0003533 A1* | 1/2014 | He | ........... | H04N 19/00 375/240.25 |
| 2014/0210652 A1* | 7/2014 | Bartnik | ................ | H04N 19/436 341/67 |
| 2014/0362925 A1* | 12/2014 | Nguyen | ............ | H03M 7/4018 375/240.18 |
| 2015/0092833 A1 | 4/2015 | Ku et al. | | |
| 2016/0345030 A1 | 11/2016 | Karczewicz et al. | | |
| 2016/0353112 A1* | 12/2016 | Zhang | ................. | H04N 19/174 |
| 2016/0353113 A1* | 12/2016 | Zhang | ................... | H04N 19/13 |
| 2016/0373742 A1* | 12/2016 | Zhao | ................... | H04N 19/136 |

FOREIGN PATENT DOCUMENTS

| | | | | |
|---|---|---|---|---|
| WO | WO-2017041676 A1 * | 3/2017 | .......... | H04N 19/167 |
| WO | WO 2017041676 A1 | 3/2017 | | |

OTHER PUBLICATIONS

China National Intellectual Property Administration, International Search Report and Written Opinion for PCT/CN2019/102284, dated Nov. 21, 2019.

Extended European Search Report dated May 6, 2022 in European Patent Application No. 198513883, citing documents AA and AX therein, 8 pages.

Schwarz, H., et al., "Description of Core Experiment 7 (CE 7): Quantization and coefficient coding", Joint Video Experts Team (JVET) of ITU-T SG 16 WP 3 and ISO/IEC JTC 1/SC 29/WG 11, Document: JVET-K1027-v0, XP030200053, 2018, 17 total pages.

* cited by examiner

CODING TRANSFORM COEFFICIENTS WITH THROUGHPUT CONSTRAINTS

CROSS REFERENCE TO RELATED PATENT APPLICATION(S)

The present disclosure is part of a non-provisional application that claims the priority benefit of U.S. Provisional Patent Application No. 62/722,237 filed on 24 Aug. 2018, U.S. Provisional Patent Application No. 62/734,277 filed on 21 Sep. 2018, U.S. Provisional Patent Application No. 62/735,100 filed on 22 Sep. 2018, and U.S. Provisional Patent Application No. 62/735,927 filed on 25 Sep. 2018. Contents of above-listed applications are herein incorporated by reference.

TECHNICAL FIELD

The present disclosure relates generally to video processing. In particular, the present disclosure relates to methods of coding transform coefficients.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized, and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

A coded block flag (CBF) is utilized to signal if there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A nonzero transform block is further divided into non-overlapped subblocks. A syntax element coded_sub_block_flag may be signaled to indicate whether a current subblock contains any nonzero coefficients. When coded_sub_block_flag is equal to 0, the associated transform subblock is not further coded and all the coefficients in the current transform subblock are inferred to be equal to 0. Otherwise, the associated transform block contains at least one non-zero transform coefficient. The values of the transform coefficient levels in the associated subblock are entropy coded using multiple subblock coding passes. In each coding pass, the individual transform coefficients are visited once according to a pre-defined scanning order.

In HEVC, a syntax element sig_coeff_flag is signaled in the $1^{st}$ subblock coding pass to indicate whether the absolute value of a current transform coefficient level is greater than 0. A syntax element coeff_abs_level_greater1_flag is further signaled in the 2nd coding pass for a current coefficient with sig_coeff_flag equal to 1 to indicate whether the absolute value of the associated transform coefficient level is greater than 1. A syntax element coeff_abs_level_greater2_flag is further signaled in the 3rd coding pass for a current coefficient with coeff_abs_level_greater1_flag equal to 1 to indicate whether the absolute value of the associated transform coefficient level is greater than 2. The sign information and the remaining level values are further signaled by syntax elements coeff_sign_flag and coeff_abs_level_remaining in the $4^{th}$ coding and $5^{th}$ subblock coding passes, respectively.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coder (e.g., a video encoder or a video decoder) that constrains the total number of regular bins used for entropy coding syntax elements of a current block is provided. The video coder entropy encodes or decodes the syntax elements selectively as either regular bins using context modeling or as bypass bins without context modeling. A constraint is specified to limit a total number of regular bins used for entropy coding the syntax elements. There may be no constraint limiting a number of regular bins specific to an individual syntax element.

In some embodiments, the plurality of syntax elements are coded in a plurality of coding passes. A total number of regular bins used for entropy coding the syntax elements in a first coding pass is limited by the constraint. The plurality of syntax elements specify a plurality of transform coefficients, wherein an absolute value of a transform coefficient is indicated by at least a first flag, a second flag, and a third flag that are entropy coded in the first coding pass.

In some embodiments, the constraint limiting the number of regular bins is larger for a first, larger block than for a second, smaller block. In some embodiments, the constraint limiting the number of regular bins is different for a first color component than for a second color component. In some embodiments, the constraint limiting the number of regular bins is computed by multiplying a default constraint with a predefined factor that is derived from a ratio of a number of coded subblocks in the current block and a number of all subblocks in the current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
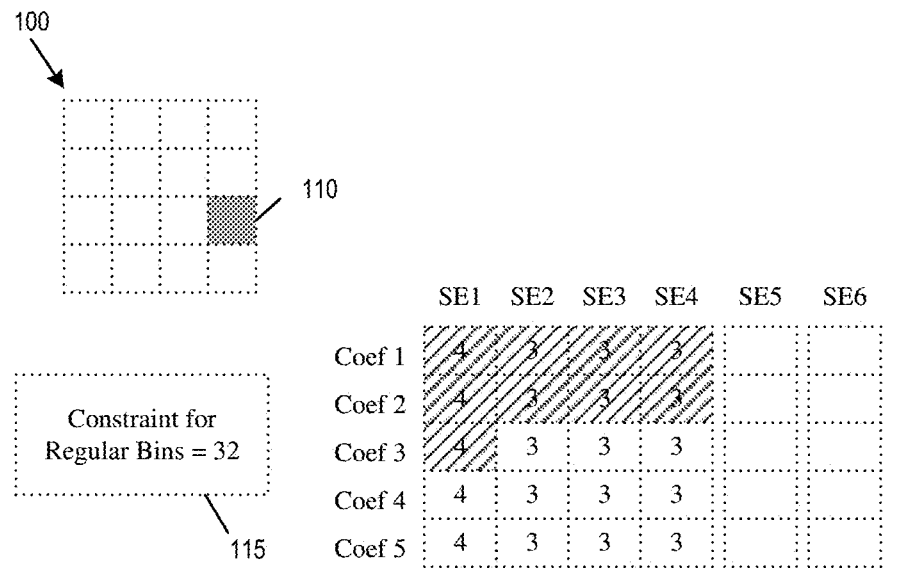
FIG. 1 conceptually illustrates a video coder selectively entropy coding syntax elements of a subblock of a block in either regular mode or bypass mode based on a constraint on numbers of regular bins used for the subblock.
Figure 1:
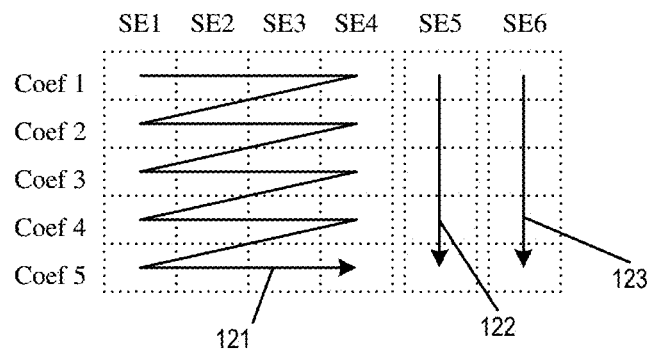

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Joint Video Expert Team (JVET) of ITU-T SG16 WP3 and ISO/IEC JTC1/SC29/WG11 are currently in the process of establishing a next-generation video coding standard. Some of the work is specified in Versatile Video Coding (VVC) Working Draft (WD) 2 (B. Brossey et al., "Versatile Video Coding (Draft 2)," Joint Video Expert Team (JVET) of ITU-T VCEG (Q6/16) and ISO/IEC MPEG (JTC 1/SC 29/WG 11), Doc. JVEO61001, 11th Meeting: Ljubljana, SI, 10-18 Jul. 2018).

VVC WD2 specifies that the transform coefficients of a coded block may be quantized by dependent scalar quantization. The selection of one of the two quantizers is specified by a state machine with four states. The state for a current transform coefficient is determined by the state and the parity of the absolute level value for the preceding transform coefficient in scanning order. The syntax elements sig_coeff_flag, par_level_flag and rem_abs_gt1_flag are signaled in the 1st subblock coding pass. The partially reconstructed absolute value of a transform coefficient level from the 1st is given by AbsLevelPass1=sig_coeff_flag+par_level_flag+2*rem_abs_gt1 flag Context selection for entropy coding sig_coeff_flag is dependent on the state for the current coefficient. par_level_flag is thus signaled in the 1st coding pass for deriving the state for the next coefficient. The syntax elements rem_abs_gt2_flag, abs_remainder, and coeff_sign_flag are further signaled in the 2nd, 3rd, and 4th coding passes, respectively. The fully reconstructed absolute value of a transform coefficient level is given by AbsLevel=AbsLevelPass1+2*(rem_abs_gt2_flag+abs_remainder) The transform coefficient level is given by TransCoeffLevel=(2*AbsLevel−(QState>1?1:0))*(1−2*coeff_sign_flag), where QState indicates the state for the current transform coefficient.

I. Coding Transform Coefficients

Some embodiments of the disclosure provide a video coder that signals or parses the absolute value of a transform coefficient level using multiple coding passes. In some embodiments, the fully reconstructed absolute value of a transform coefficient level can be represented by AbsLevel=(AbsLevelRS1<<1)+ParityBit, where ParityBit indicates the parity of the absolute value of a transform coefficient level and AbsLevelRS1 indicates the absolute value of a transform coefficient level downward shifted by 1. The syntax elements sig_coeff_flag, coeff_abs_level_greater1_flag and par_level_flag may be signaled in the 1st coding pass. When sig_coeff_flag is equal to 0, the associated transform coefficient level is equal to 0. Otherwise, coeff_abs_level_greater1_flag is further signaled to indicate whether the absolute value of the associated transform coefficient level is greater than 1. When coeff_abs_level_greater1_flag is equal to 0, AbsLevelRS1 is set equal to 0 and ParityBit is set equal to sig_coeff_flag for the associated transform coefficient. Otherwise, par_level_flag is further signaled to indicate the value of ParityBit for the associated transform coefficient level. The further information about AbsLevelRS1 and the sign for the associated transform coefficient level can be further signaled using one or multiple coding passes.

When coeff_abs_level_greater1_flag is greater than 1 for a current coefficient, the video coder may further signal a syntax element coeff_abs_level_rs1_gt1_flag to indicate whether AbsLevelRS1 is greater than 1. When coeff_abs_level_rs1_gt1_flag is equal to 0, AbsLevelRS1 is set equal to 1 for the associated transform coefficient level. Otherwise, AbsLevelRS1 is inferred to be greater than 1 and the remaining value of AbsLevelRS1 is further signaled. In some embodiments, the syntax element coeff_abs_level_rs1_gt1_flag is signaled in the same coding pass as coeff_abs_level_greater1_flag. In some embodiments, coeff_abs_level_rs1_gt1_flag is signaled in a separate coding pass after the coding pass for signaling coeff_abs_level_greater1_flag.

When coeff_abs_level_rs1_gt1_flag is greater than 1 for a current coefficient, the video coder may further signal a syntax element coeff_abs_level_rs1_gt2_flag to indicate whether AbsLevelRS1 is greater than 2. When coeff_abs_level_rs1_gt2_flag is equal to 0, AbsLevelRS1 is set equal to 2 for the associated transform coefficient level. Otherwise, AbsLevelRS1 is inferred to be greater than 2 and the remaining value of AbsLevelRS1 is further signaled. coeff_abs_level_rs1_gt2_flag may be signaled in the same coding pass as coeff_abs_level_rs1_gt1_flag or signaled in a separate coding pass after the coding pass for signaling coeff_abs_level_rs1_gt1_flag. In some embodiments, syntax elements coeff_abs_level_greater1_flag, coeff_abs_level_rs1_gt1_flag and coeff_abs_level_rs1_gt2_flag are all signaled in one coding pass.

In some embodiments, the video coder performs entropy coding of the residual block quantized by using dependent scalar quantization. The video coder utilizes the syntax elements sig_coeff_flag, coeff_abs_level_greater1_flag, par_level_flag, coeff_abs_level_rs1_gt1_flag, coeff_abs_level_rs1_gt2_flag, and coeff_abs_level_rs1_remainder for coding the absolute value of a transform coefficient level. Table 1 below provides a syntax table for decoding a residual transform block. The syntax element coeff_abs_level_rs1_remainder is employed to signal the remaining absolute value of an associated coefficient level when coeff_abs_level_rs1_gt2_flag is equal to 1. The syntax elements sig_coeff_flag, coeff_abs_level_greater1_flag, coeff_abs_level_rs1_gt1_flag, coeff_abs_level_rs1_gt2_flag, and coeff_abs_level_rs1_remainder are inferred to be equal to 0 when not coded.

TABLE 1

Residual Coding Syntax

| | Descriptor |
|---|---|
| residual_coding( x0, y0, log2TbWidth, log2TbHeight, cIdx ) { | |
|   if( transform_skip_enabled_flag && ( cIdx ! = 0 \|\| cu_mts_flag[ x0 ][ y0 ] = = 0) && ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight) < 2 ? 1 : 2) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbSize ][ log2TbHeight − log2SbSize ] [ lastSubBlock ][ 0 ] | |
|     yS = DiagScanOrder[ log2TbWidth − log2SbSize ][ log2TbHeight − log2SbSize ] [ lastSubBlock ][ 1 ] | |
|     xC = ( xS << log2SbSize ) + DiagScanOrder[ log2SbSize ][ log2SbSize ][ lastScanPos ][ 0 ] | |
|     yC = ( yS << log2SbSize ) + DiagScanOrder[ log2SbSize ][ log2SbSize ][ lastScanPos ][ 1 ] | |
|   } while( (xC != LastSignificantCoeffX ) \|\| ( yC != LastSignificantCoeffY ) ) | |
|   QState = 0 | |
|   for( i = lastSubBlock; i >= 0; i− − ) { | |
|     startQStateSb = QState | |

TABLE 1-continued

Residual Coding Syntax

| | Descriptor |
|---|---|
| xS = DiagScanOrder[ log2TbWidth − log2SbSize ][ log2TbHeight − log2SbSize ] [ lastSubBlock ][ 0 ]<br>yS = DiagScanOrder[ log2TbWidth − log2SbSize ][ log2TbHeight − log2SbSize ] [ lastSubBlock ][ 1 ]<br>inferSbDcSigCoeffFlag = 0<br>if( ( i < lastSubBlock ) && ( i > 0 ) ) {<br>  coded_sub_block_flag[ xS ][ yS ] | |
| | ae(v) |
|   inferSbDcSigCoeffFlag = 1<br>}<br>firstSigScanPosSb = numSbCoeff<br>lastSigScanPosSb = −1<br>for( n = (i = = lastSubBlock ) ? lastScanPos − 1 : numSbCoeff − 1; n >= 0; n− − )<br>{<br>xC = ( xS << log2SbSize ) + DiagScanOrder[ log2SbSize ][ log2SbSize ][ n ][ 0 ]<br>yC = ( yS << log2SbSize ) + DiagScanOrder[ log2SbSize ][ log2SbSize ][ n ][ 1 ]<br>if( coded_sub_block_flag[ xS ][ yS ] && ( n > 0    ‖ !inferSbDcSigCoeffFlag ) ) {<br>  sig_coeff_flag[ xC ][ yC ] | |
| | ae(v) |
| }<br>ParityBit[n] = sig_coeff_flag[ xC ][ yC ]<br>if( sig_coeff_flag[ xC ][ yC ] ) {<br>if( lastSigScanPosSb = = −1 )<br>lastSigScanPosSb = n<br>firstSigScanPosSb = n<br>coeff_abs_level_greater1_flag [ n ]<br>if( coeff_abs_level_greater1_flag [ n ] ) {<br>par_level_flag[ n ]<br>    coeff_abs_level_rs1_gt1_flag [ n ]<br>ParityBit[n] = par_level_flag[ n ] | ae(v)<br><br><br>ae(v)<br>ae(v) |
| }<br>}<br>AbsLevelPass1[ xC ][ yC ] =<br>2 * ( coeff_abs_level_greater1_flag[ n ] + coeff_abs_level_rs1_gt1_flag[ n ] ) + ParityBit[ n ]<br>if( dep_quant_enabled_flag )<br>QState = QStateTransTable[ QState ][ ParityBit[ n ] ]<br>}<br>for( n = numSbCoeff − 1; n >= 0; n− −) {<br> if(coeff_abs_level_rs1_gt1_flag [ n ] )<br>  coeff_abs_level_rs1_gt2_flag [ n ] | |
| | ae(v) |
| }<br>for( n = numSbCoeff − 1; n >= 0; n− −) {<br>xC = ( xS << log2SbSize ) + DiagScanOrder[ log2SbSize ][ log2SbSize ][ n ][ 0 ]<br>yC = ( yS << log2SbSize ) + DiagScanOrder[ log2SbSize ][ log2SbSize ][ n ][ 1 ]<br> if(coeff_abs_level_rs1_gt2_flag [ n ] )<br>   coeff_abs_level_rs1_remainder[ n ]<br> AbsLevel[ xC ][ yC ] = AbsLevelPass1[ xC ][ yC ] +<br>2 * (coeff_abs_level_rs1_gt2_flag [ n ] + coeff_abs_level_rs1_remainder [ n ] )<br>}<br>if( dep_quant_enabled_flag ‖ !sign_data_hiding_enabled_flag )<br>signHidden = 0<br>else<br>signHidden = ( lastSigScanPosSb − firstSigScanPosSb > 3 ?   1<br>      : 0 )<br>for( n = numSbCoeff − 1; n >= 0; n− − ) {<br>xC = ( xS << log2SbSize ) + DiagScanOrder[ log2SbSize ][ log2SbSize ][ n ][ 0 ]<br>yC = ( yS << log2SbSize ) + DiagScanOrder[ log2SbSize ][ log2SbSize ][ n ][ 1 ]<br> if( sig_coeff_flag[ xC ][ yC ] &&<br>( !signHidden ‖   (n != firstSigScanPosSb ) ) )<br>  coeff_sign_flag[ n ] | |
| | ae(v) |
| }<br>if( dep_quant_enabled_flag ) {<br>    QState = startQStateSb<br>    for( n = numSbCoeff − 1; n >= 0; n− −) {<br>    xC = ( xS << log2SbSize ) +<br>DiagScanOrder[ log2SbSize ][ log2SbSize ][ n ][ 0 ]<br>    yC = ( yS << log2SbSize ) + | |

TABLE 1-continued

Residual Coding Syntax

Descriptor

```
    DiagScanOrder[ log2SbSize ][ log2SbSize ][ n ][ 1 ]
    if( sig_coeff_flag[ xC ][ yC ] )
    TransCoeffLevel[ x0 ][ y0 ][ cIdx ][ xC ][ yC ] =
    ( 2 * AbsLevel[ xC ][ yC ] − ( QState > 1 ? 1 : 0 ) ) * ( 1  − 2 *
    coeff_sign_flag[ n ] )
    QState = QStateTransTable[ QState ][ ParityBit [ n ] ]
    } else {
    sumAbsLevel = 0
    for( n = numSbCoeff − 1; n >= 0; n− − ) {
    xC = ( xS << log2SbSize ) +
    DiagScanOrder[ log2SbSize ][ log2SbSize ][ n ][ 0 ]
    yC = ( yS << log2SbSize ) +
    DiagScanOrder[ log2SbSize ][ log2SbSize ][ n ][ 1 ]
    if( sig_coeff_flag[ xC ][ yC ] ) {
    TransCoeffLevel[ x0 ][ y0 ][ cIdx ][ xC ][ yC ]   = AbsLevel[ xC ][ yC ] *
    ( 1 − 2 * coeff_sign_flag[ n ] )
    if( signHidden )   {
    sumAbsLevel += AbsLevel[ xC ][ yC ]
    if( ( n           = = firstSigScanPosSb ) && ( sumAbsLevel % 2 )
           = = 1 ) )
    TransCoeffLevel[ x0 ][ y0 ][ cIdx ][ xC ][ yC ] =
    −TransCoeffLevel[ x0 ][ y0 ][ cIdx ][ xC ][ yC ]
    }
    }
    }
    }
    }
    }
    if( cu_mts_flag[ x0 ][ y0 ] && ( cIdx = = 0 )   &&
    !transform_skip_flag[ x0 ][ y0 ][ cIdx ] &&
    ( ( CuPredMode[ x0 ][ y0 ] = = MODE_INTRA && numSigCoeff > 2 )
    | | ( CuPredMode[ x0 ][ y0 ] = = MODE_INTER ) ) ) {
    mts_idx[ x0 ][ y0 ]                                                          ae(v)
    }
```

Some embodiments of the disclosure relate to complexity reduction by reducing the number of coding passes for entropy coding a transform block or a sub-block. For example, in some embodiments, the syntax element rem_abs_gt2_flag may be coded in the same coding pass as the syntax element rem_abs_gt1_flag. In some embodiments, the information on the signs and remaining values of transform coefficients are entropy coded using CABAC in a bypass mode and may be signaled in one coding pass. In one embodiment, all syntax elements entropy coded using CABAC in a regular mode are signaled in one coding pass. All syntax elements entropy coded using CABAC in a bypass mode are signaled in another coding pass.

II. Constraint on Regular Bins for a Subblock or a Coding Pass

For achieving high compression efficiency, the context-based adaptive binary arithmetic coding (CABAC) mode, or known as regular mode, is employed for entropy coding the values of the syntax elements in HEVC. As the arithmetic coder in the CABAC engine only encode the binary symbol values, the CABAC operation first needs to convert the value of a syntax element into a binary string, the process commonly referred to as binarization. During the coding process, the probability models are gradually built up from the coded symbols for the different contexts. The selection of the modeling context for coding the next binary symbol can be determined by the coded information. Values of syntax elements processed in the regular mode are referred to as "regular bins" and entropy coded by using context modeling. Symbols may also be coded without the context modeling stage and assume an equal probability distribution, commonly referred to as the bypass mode, for improving bitstream parsing throughput rate. Values of syntax elements processed in the bypassed mode are referred to as "bypass bins" and entropy coded by without context modeling. In HEVC, the values of the syntax elements such as coded_sub_block_flag, sig_coeff_flag, coeff_abs_level_greater1_flag, and coeff_abs_level_greater2_flag in a transform subblock are coded in the regular mode as regular bins. The values of the syntax elements coeff_sign_flag and coeff_abs_level_remaining in a transform subblock are coded in the bypass mode as bypass bins. In order to limit the total number of the regular bins for entropy coding transform coefficient levels in a sub-block under the worst-case scenario, each subblock is allows to code only up to eight coeff_abs_level_greater1_flag values and one coeff_abs_level_greater2_flag value. In this way, the maximum number of the regular bins in each subblock is limited to 26.

Some embodiments of the disclosure relate to the constraints on the maximum allowed numbers of CABAC regular bins for coding a transform subblock. Having the constraint for regular bins of a subblock facilitates controlling the bitstream parsing throughput rate per subblock (e.g., under the worst-case condition) because entropy coding using CABAC in the regular mode involves higher complexity than in the bypass mode. In some embodiments, a video coder may apply the constraint on the maximum allowed number of the regular bins in one subblock or one subblock coding pass but have no specific constraints on the maximum allowed numbers of the regular bins for individual syntax elements present in the said subblock or the said subblock coding pass. The video coder may track the accumulated number of consumed regular bins in a current subblock or a current coding pass. When the specified maximum allowed number of regular bins is reached, the video coder may have the CABAC engine switched to the bypass mode for the remaining coding passes in the current subblock. Or the video coder may terminate the coding passes in the regular CABAC mode. The remaining absolute values of the transform coefficient levels are coded by the subblock coding passes in the bypass mode.

FIG. 1 conceptually illustrates a video coder selectively entropy coding syntax elements of a subblock of a block in either regular mode or bypass mode based on a constraint on numbers of regular bins used for the subblock. The figure illustrates a current block 100 that is being coded (encoded or decoded). The current block 100 may be a transform block or TU of a block of pixels such as a coding unit (CU). The current block 100 includes 4×4=16 subblocks, including a subblock 110.

The subblock 110 includes multiple syntax elements. These syntax elements (SEs) may represent several transform coefficients (e.g., Coef1-Coef5) of the current block. Each transform coefficient may be represented by several syntax elements (e.g., SE1-SE6). The syntax elements of a transform coefficient may include flags that indicate the absolute value and the parity of the transform coefficient.

These syntax elements are entropy coded using CABAC either as regular bins (to be coded in regular mode by context modeling) or bypass bins (to be coded in bypass mode without context modeling). The video coder imposes a constraint 115. In some embodiments, the constraint limits a maximum allowed number of CABAC regular bins for the transform block 100, e.g., the maximum allowed numbers of CABAC regular bins for coding the subblock 110. The constraint provides a budget of regular bins that is shared by the syntax elements of the block or of the subblock. Entropy coding each syntax element as regular bins consumes the budget until there is no more budget left.

In the example of FIG. 1, the constraint 115 for the subblock 110 is 32. Some of the syntax elements are coded by using regular mode (syntax elements illustrated as shaded). These syntax elements include Coef1:SE1, Coef1:SE2, Ceof1:SE3, Coef1:SE4, Coef2:SE1, Coef2:SE2, Ceof2:SE3, Coef2:SE4, and Coef3:SE1. Entropy encoding these syntax elements consumes 30 regular bins. To encode any more syntax elements as regular bins would exceed the subblock constraint of 32. Consequently, all other syntax elements are coded as bypass bins (illustrated as unshaded).

The example of FIG. 1 also illustrates several coding passes 121, 122, and 123. In the first coding pass 121, the video coder entropy encodes SE1-SE4 of each coefficient, specifically in the order of Coef1:SE1, Coef1:SE2, Ceof1:SE3, Coef1:SE4, Coef2:SE1, Coef2:SE2, Ceof2:SE3, . . . etc. In the second coding pass 122, the video coder entropy encodes SE5 of each coefficient, specifically in the order of Coef1:SE5, Coef2:SE5, Coef3:SE5, Coef4:SE5, . . . etc. In the third coding pass 123, the video coder entropy encodes SE6 of each coefficient, specifically in the order of Coef1:SE6, Coef2:SE6, Coef3:SE6, Coef4:SE6, . . . etc.

In some embodiments, the constraint 115 limits the total number of regular bins that are used by all syntax elements by the subblock, regardless of which coding passes they are coded in. In some embodiments, the constraint 115 limits the total number of regular bins that are used by syntax elements coded during the first coding pass 121 (or the leading coding pass) but does not limit the number of regular bins used during other coding passes.

In some embodiments, regardless of whether the constraint 115 is applicable to all syntax elements of the subblock 110 or only to syntax elements coded in the first coding pass 121, the video coder has no specific constraints on the maximum allowed numbers of the regular bins for individual syntax elements present in the subblock 110 or in the first coding pass 121. In some embodiments, a video coder may apply the constraint on the maximum allowed number of the regular bins in one subblock or one subblock coding pass (e.g., the first coding pass 121) but also apply specific constraints on the maximum allowed numbers of the regular bins for individual syntax elements present in the subblock or the subblock coding pass.

In some embodiments, HEVC's constraints on the specified maximum allowed numbers of regular bins for syntax elements coeff_abs_level_greater1_flag and coeff_abs_level_greater2_flag are removed. Specifically, the syntax elements coeff_abs_level_greater1_flag and coeff_abs_level_greater2_flag are coded in a leading subblock coding pass. The leading subblock coding pass in the regular CABAC mode may be terminated once the accumulated number of the regular bins in the current subblock reaches the specified maximum allowed number 25 or 26. The remaining absolute values of the transform coefficient levels are coded by the syntax element coeff_abs_level_remaining in a bypass mode. In this way, the video coder may still meet the worst-case constraint on the number of regular bins per subblock while being able to use more regular bins than the maximum numbers originally specified for syntax elements coeff_abs_level_greater1_flag and coeff_abs_level_greater2_flag.

In some embodiments, a video coder may apply a constraint on the maximum allowed number of regular bins in the leading subblock coding pass for entropy coding the transform coefficient levels generated by dependent scalar quantization. The video coder may track the accumulated number of consumed regular bins in a current leading coding pass for signaling sig_coeff_flag, par_level_flag and rem_abs_gt1_flag, or for signaling sig_coeff_flag, coeff_abs_level_greater1_flag, par_level_flag and coeff_abs_level_rs1_gt1_flag.

When the accumulated number of regular bins is greater than a specified threshold value, the video coder may switch its CABAC engine to bypass mode for coding the remaining pass in bypass bins. Or the video coder may terminate the current leading coding pass. The remaining absolute values of the transform coefficient levels are coded by the subblock coding pass in the bypass mode for signaling abs_remainder or for signaling coeff_abs_level_rs1_remainder.

In some embodiments, a video coder may apply a constraint on the maximum allowed number of regular bins for entropy coding a transform subblock resulted from dependent scalar quantization. The video coder may track the accumulated number of consumed regular bins for signaling sig_coeff_flag, par_level_flag, rem_abs_gt1_flag and rem_abs_gt2_flag or for signaling sig_coeff_flag, coeff_abs_level_greater1_flag, par_level_flag, coeff_abs_level_rs1_gt1_flag and coeff_abs_level_rs1_gt2_flag. When the accumulated number of regular bins is greater than a specified threshold value, the remaining absolute values of the transform coefficient levels are all coded by the subblock coding pass in the bypass mode for signaling abs_remainder or for signaling coeff_abs_level_rs1_remainder.

In some embodiments, the coeff_abs_level_rs1_gt1_flag may be integrated into the first coding pass. Specifically, gt1_flag (coeff_abs_level_greater1_flag, or rem_abs_gt1_flag) is signaled before the par_flag (the parity bit, par_level_flag), and the signaling of gt2_flag (coeff_abs_level_rs1_gt1_flag, or rem_abs_gt2_flag) is moved to the first coding pass. Some example of the codewords for different levels are listed in Table 2.

TABLE 2

Examples of the Codewords for Different Levels

| Abs Level | 1st Pass | | | | 2nd Pass |
|---|---|---|---|---|---|
| | Sig_flag | Gt1_flag | Par_flag | Gt2_flag | Rem_abs |
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |

Since the context modeling of sig_flag (sig_coeff_flag) is related to the state of dependent quantization determined by the parity bit of the previous coefficient, and the state transition is dependent on the parity bit of the level, the modified parsing process is described as below. During the paring stage of the sig_flag, the context models for even level will be prepared and stored in the local buffer. If the sig_flag is 0, the stored context models for even level is applied to the next sig_flag. If the sig_flag is 1, gt1_flag is parsed. During the parsing stage of gt1_flag, the context models for odd level is loaded in and then stored in the local buffer. If the gt1_flag is 0, the stored context models for odd level can be applied to the next sig_flag. If the gt1_flag is 1, then both the par_flag and gt2_flag are parsed. These two bins are parsed in order, that is, the bins for par_flag is parsed the bins for gt2_flag. If the par_flag is 0, the context models for even level will be loaded in during the parsing stage of gt2_flag. If the par_flag is 1, the stored context models for odd level can be used for the next sig_flag. In one embodiment, one bin is always parsed after the parity bit in the first coding pass. After moving the gt2_flag to the first coding pass, the context modeling can be modified accordingly.

In some embodiments, the value of the variable sumAbs1 becomes the sum of partially reconstructed absolute levels after the first coding pass, which is equal to sum of the coeff_partial (=sig_flag+gt1_flag+par_flag+(gt2_flag<<1)) or min(4+(x&1), x) in the five neighboring positions, where x is the absolutely level of the coefficient. In some embodiments, the value of sumAbs1 only takes sig_flag, par_flag, and gt1_flag into account. Specifically, the sumAbs1 is equal to the sum of min(coeff_partial, 3) or (sig_flag+gt1_flag+par_flag) or min(2+(x&1), x) in the five neighboring positions. In some embodiment, the video coder parses at least one bin after par_flag in the same pass. Therefore, the time segment spent on parsing other bins can be used to prepare the context models for the next sig_flag.

Figure 2:
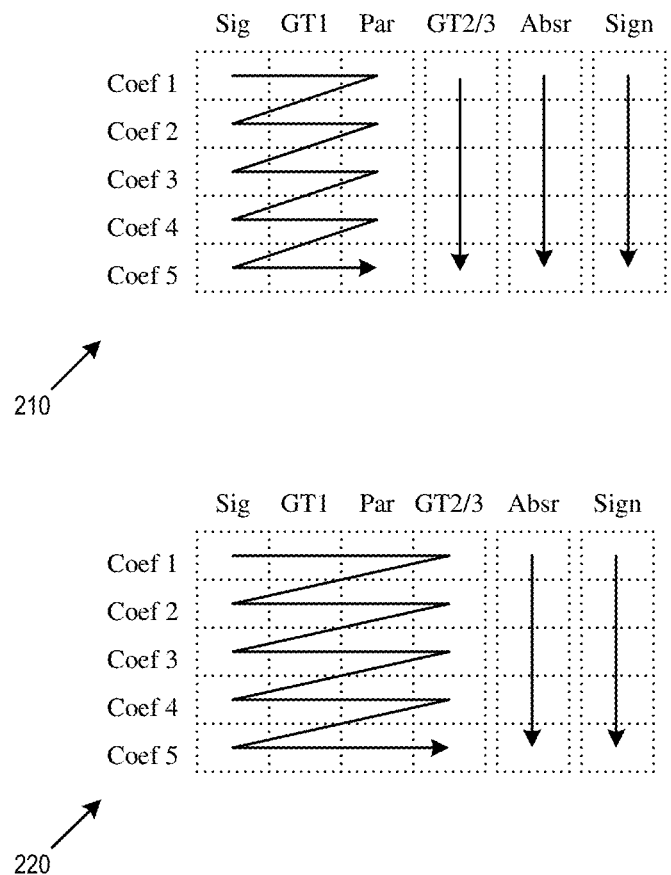
FIG. 2 illustrates coding passes that includes flags that indicate the absolute value of a transform coefficient level when entropy coding a subblock of a transform block.

FIG. 2 illustrates coding passes that includes flags that indicate the absolute value of a transform coefficient level when entropy coding a subblock of a transform block. The figure illustrates coding passes for entropy coding transform coefficients of a subblock of a transform block. Each transform coefficient includes syntax elements that indicates the absolute value (sig_flag, gt1_flag, gt2_flag), the parity (par_flag), the remainder (absr), and the sign of the transform coefficient.

The sig_flag may refer to the sig_coeff_flag, or any other flag that indicates whether the absolute value of a corresponding transform coefficient level (e.g., value of AbsLevelRS1) is greater than 0. The gt1_flag may refer to the coeff_abs_level_greater1_flag or any other flag that is used to indicate whether the absolute value of a corresponding transform coefficient is greater than 1. The gt2_flag may refer to the coeff_abs_level_rs1_gt1_flag, or any other flag that is used to indicate whether the absolute value of a corresponding transform coefficient is greater than 3. The par_flag may refer to the par_level_flag, or any other flag that indicates the parity of the absolute value of a transform coefficient level (e.g., the value of ParityBit). The remainder may be indicated by a flag such as abs_remainder or coeff_abs_level_remaining. The sign may be indicated by a flag such as coeff_sign_flag.

FIG. 2 illustrates two schemes 210 and 220 of coding passes. In the first scheme 210 of coding passes, the sig_flag, the gt1_flag, and the par_flag of each transform coefficient are coded in a first coding pass, while the gt2_flag, is coded in a second coding pass, the remainder is coded in a third coding pass, and the sign is coded in a fourth coding pass. In other words, not all indicators of absolute values of transform coefficients are in the same coding pass. In the second scheme 220 of coding passes, the sig_flag, the gt1_flag, the par_flag and the gt2_flag of each transform coefficient are coded in a same first coding pass. The remainder and the sign are coded in second and third coding passes, respectively. In other words, at least three, or all, indicators of absolute value of a transform coefficient are in the same coding pass. Regardless of whether gt2_flag is coded in the first coding pass or a subsequent coding pass, in some embodiments, the total number of regular bins used to entropy code the syntax elements of the first coding pass or the subblock of the transform block is limited by a constraint or budget as described reference to FIG. 1 above.

In some embodiments, the maximum number of regular bins of some syntax elements or the maximum number of regular bins of some coding passes may be further specified. For example, the maximum number of regular bins for coeff_abs_level_rs1_gt2_flag or the maximum number of regular bins for coding coeff_abs_level_rs1_gt2_flag in a coding pass can be specified by the video coder. When coding these syntax elements in a coding pass, when the accumulated number of regular bins is greater than a specified threshold value, the video coder may switch its CABAC engine to bypass mode for coding the remaining bins of the coding pass as bypass bins or terminate the current (leading) coding pass. The remaining absolute values of the transform coefficient levels are coded by the subblock coding pass in the bypass mode. In some embodiments, some of the syntax elements are not counted for the regular bin number constraint or can always be coded in regular bins even when there is no allowed regular bin quota or there is no budget left for regular bins. For example, in some embodiments, the sig_coeff_flag is coded in regular bin regardless of any regular bin constraint for its coding pass. For another example, in some embodiments, the sig_coeff_flag and the par_level_flag are coded in regular bin (regardless of any regular bin constraint for its coding pass). In some embodiments, if there is no quota or no budge left for using regular bins to code par_level_flag and rem_abs_gt1_flag in the coding pass, then only the sig_coeff_flag is coded in the coding pass as regular bins. The state for context modeling of sig_coeff_flag may remain the same or transition with the parsed result of sig_coeff_flag.

In some embodiments, in the coding pass, if the remaining available regular bin number is not larger than the required regular bin number of a coefficient in this coding pass, i.e., if the remaining budget for regular bins for this coding pass is insufficient to meet the required number of regular bins for coding the coefficient, the video coder may switch its CABAC engine to the bypass mode for the remainder of the coding pass, or the video coder may terminate the current leading coding pass. The remaining absolute values of the transform coefficient levels are all coded by the subblock coding pass in the bypass mode. This required remaining budget for coding a coefficient as regular bins in the coding pass is also referred as the termination threshold for the coefficient. For example, if sig_coeff_flag, par_level_flag, and rem_abs_gt1_flag are coded in a coding pass, the termination threshold (for using regular bins) is 3. If sig_coeff_flag, par_level_flag, rem_abs_gt1_flag, and rem_abs_gt2_flag are coded in a coding pass, the termination threshold is 4.

In some embodiments, the specified constraints on the maximum allowed numbers of regular bins for coding transform subblocks may be pre-defined or explicitly signaled in the bitstream, for example, using one or multiple high-level syntax sets such as sequence parameter set (SPS), picture parameter set (PPS) or slice header. The specified constraints may be dependent on the profile and the level indicated in the coded bitstream. Different constraints may be employed for different color components. Different constraints may be employed for different transform subblock sizes. In some embodiments, a video coder may limit the maximum allowed number of regular bins for a 2×2 subblock to be equal to one quarter of the maximum allowed number of regular bins for a 4×4 subblock. In some embodiments, a video coder may limit the maximum allowed number of regular bins for a 4×4 chroma subblock to be equal to one half of the maximum allowed number of regular bins for a 4×4 luma subblock. The specified constraint for a 4×4 transforms subblock may be signaled in the SPS. In one example, the specified constraint for a 4×4 luma subblock, 4×4 chroma subblock, 2×2 chroma subblock may be signaled in the SPS. In one embodiment, the maximum allowed number of regular bins for a 4×4 chroma subblock is equal to or smaller than the maximum allowed number of regular bins for a 4×4 luma subblock. In another embodiment, the maximum allowed number of regular bins for a 2×2 chroma subblock is equal to or smaller than the maximum allowed number of regular bins for a 2×2 chroma subblock.

In some embodiments, the maximum regular bins of a 4×4 luma subblock can be 25, 30, or 32, the maximum regular bins of a 4×4 chroma subblock can be 25, 16, or 15, the maximum regular bins of a 2×2 chroma subblock can be 2, 3, 4, 5, 6, 7, or 8. For example, the maximum regular bins of {a 4×4 luma subblock, a 4×4 chroma subblock, a 2×2 chroma subblock} can be {25, 25, 8}, {25, 25, 6}, {25, 25, 7}, {32, 16, 4}, {32, 32, 8}, {30, 16, 4}, {30, 15, 4}, or {30, 15, 3}.

In some embodiments, the maximum regular bins of coding coeff_abs_level_rs1_gt1_flag can also be specified. For example, the maximum regular bins of the coeff_abs_level_rs1_gt1_flag in a 4×4 luma subblock can be 2, 3, 4, or 5, the maximum regular bins of the coeff_abs_level_rs1_gt1_flag in a 4×4 chroma subblock can be 0, 1, 2, 3, or 4, the maximum regular bins of the coeff_abs_level_rs1_gt1_flag in a 2×2 chroma subblock can be 0, 1, or 2. For example, the maximum regular bins of {a 4×4 luma subblock, the coeff_abs_level_rs1_gt1_flag in a 4×4 luma subblock, a 4×4 chroma subblock, the coeff_abs_level_rs1_gt1_flag in a 4×4 chroma subblock, a 2×2 chroma subblock, the coeff_abs_level_rs1_gt1_flag in a 2×2 chroma subblock} can be {25, 4, 25, 4, 8, 2}, {25, 4, 25, 4, 6, 2}, {25, 4, 25, 4, 6, 1}, {25, 3, 25, 3, 6, 2}, {25, 3, 25, 3, 6, 1}, {25, 2, 25, 2, 6, 1}, {25, 2, 25, 2, 6, 0}, {25, 1, 25, 1, 6, 1}, {25, 1, 25, 1, 6, 0}, {25, 3, 25, 3, 7, 2}, {32, 4, 16, 2, 4, 1}, {32, 4, 16, 2, 4, 0}, {32, 4, 16, 4, 4, 1}, {32, 4, 16, 4, 4, 0}, {32, 3, 16, 2, 4, 1}, {32, 3, 16, 2, 4, 0}, {30, 4, 16, 2, 4, 1}, {30, 4, 16, 2, 4, 0}, {30, 3, 16, 2, 4, 1}, {30, 3, 16, 2, 4, 0}, {30, 4, 15, 2, 4, 1}, {30, 4, 15, 2, 4, 0}, {30, 3, 15, 2, 4, 1}, {30, 3, 15, 2, 4, 0}, {30, 4, 15, 2, 3, 1}, {30, 4, 15, 2, 3, 0}, {30, 3, 15, 2, 3, 1}, {30, 3, 15, 2, 3, 0}, {32, 4, 32, 4, 8, 1}.

In some embodiments, a video coder may have the constraints on the maximum allowed numbers of regular bins specified for entropy coding some sizes of transform units or transform blocks. The constraints on the maximum allowed numbers of regular bins for a current subblock can be derived from the constraints specified for the related transform unit or transform block. For example, the constraints on the maximum allowed numbers of regular bins for 4×4 transform subblocks and 2×2 transform subblocks can be derived from the constraints on the maximum allowed numbers of regular bins for 4×4 transform blocks and 2×2 transform blocks, respectively, in a video coder.

In some embodiments, when the rem_abs_gt2_flag is included in the leading coding pass (e.g., the first coding pass) and the regular bin number constraint value of rem_abs_gt2_flag is specified separately (from the regular bin number constraint value of sig_coeff_flag, par_level_flag, rem_abs_gt1_flag) and the rem_abs_gt2_flag is signaled, the remaining level of the coefficient is coded when the partial sum of the coefficient (=sig_flag+gt1_flag+par_flag+(gt2_flag<<1) or =sig_flag+par_flag+(gt1_flag<<1)+(gt2_flag<<1)) is equal to or larger than 5 if the parity bit is signaled before rem_abs_gt1_flag and is equal to or larger than 4 if the parity bit is signaled after rem_abs_gt1_flag. Otherwise, the remaining level of the coefficient is not coded. If the rem_abs_gt2_flag is not signaled because that the available number of regular bin of rem_abs_gt2_flag is zero, the remaining level of the coefficient is coded when the partial sum of the coefficient is equal to or larger than 4 if the parity bit is signaled before rem_abs_gt1_flag and is equal to or larger than 2 if the parity bit is signaled after rem_abs_gt1_flag. Otherwise, the remaining level of the coefficient is not coded. However, if available number of regular bins is smaller than a threshold, in one embodiment, the leading coding pass is terminated, the level is coded with Golomb-Rice code directly if the coefficient is not coded by the leading pass. When the leading coding pass is terminated, the remaining level coding pass is performed. The remaining level coding pass starts from the last position of the current subblock to the first position of the subblock.

In some embodiments, the maximum allowed numbers of regular bins is specified for a TU. The threshold for terminating regular bins coding (or the budget of regular bins) of a TU can be derived from the threshold for terminating regular bins coding of a 4×4 sub-block. For example, if the TU is a luma 8×8 block and the threshold of a luma 4×4 block is 32, the threshold of this 8×8 luma TU is 32×4=128. The threshold value can be different for different color component or different TU size.

In some embodiments, the constraints on the maximum allowed numbers of regular bins is specified for a transform subblock, however, the constraint number for the allowed regular bins may depend on the current TU size, TU type, TU width, TU height, total number of subblocks in current TU, subblock size, subblock width, subblock height, color component, last significant coefficient position, last significant subblock position, or any combination of above. For example, the constraint number may depend on total number of subblocks in current TU, color component, subblock size, and last significant subblock position.

For coding the coefficients of subblocks of the TU, the allowed number of regular bins value can be shared across the subblocks. For example, in the first sub-block of the TU, the allowed number of regular bins is 128. When coding the first subblock, the allowed number of regular bins is decreased when using regular bin for coding coefficients. The remaining allowed value is used for the next subblock of the TU. In some embodiments, the number of required coded subblock can be derived after (or based on) the encoded/decoded the last significant coefficient position or the last significant subblock position. For example, a 16×16 TU has 16 4×4 subblock. The total number of allowed regular bins for the TU can be 32×16=512. After decoding the last significant coefficient position, if the number of required coded subblocks is 8, then each subblock can use 64 regular bins (64×8=512).

In some embodiments, when the last significant subblock position is determined, the number of subblocks to be coded can be determined. If the number of subblock to be coded is smaller than the total number of subblocks in current TU, i.e., some subblock is skipped in entropy coding, the constraint on the maximum allowed numbers of regular bins per subblock can be increased.

Figure 3:
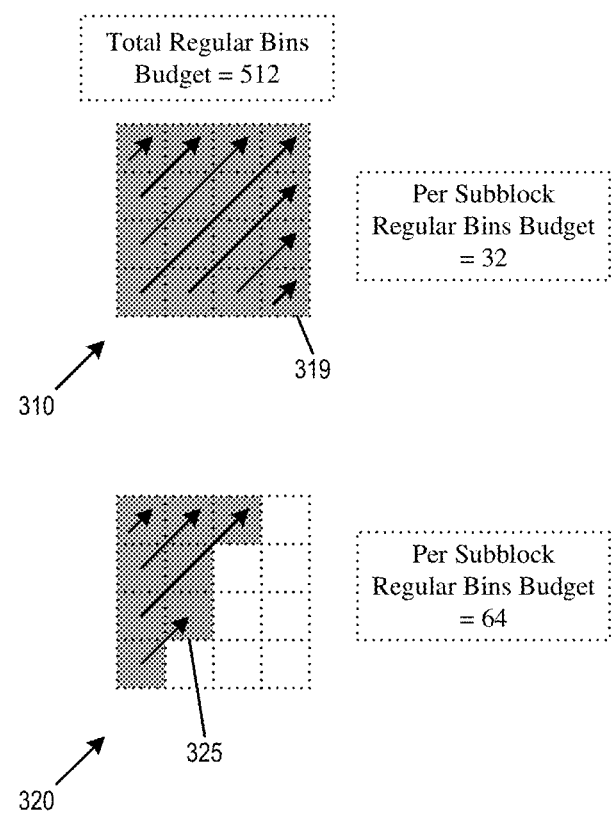
FIG. 3 illustrates sharing the allowed number of regular bins across the subblocks of a current block.

FIG. 3 illustrates sharing the allowed number of regular bins across the subblocks of a current block. The figure illustrates a first block 310 and a second block 320 that are transform blocks or TUs. Each of the first block 310 and the second block 320 has 4×4=16 subblocks. Each of the first block 310 and the second block 320 has a total constraint or budget of regular bins of 512 for the block.

All of the subblocks of the first block 310 are coded (illustrated as shaded) such that the position of the last coded subblock is subblock 319, which is the 16th subblock in the first block 310. Each subblock of the first block 310 is given a constraint or budget for regular bins of 512÷16=32.

On the other hand, only 8 of the subblocks of the second block 320 are coded such that the position of the last coded subblock is subblock 325, which is the 8th subblock in second block 320. Each coded subblock of the second block 320 is given a constraint or budge for regular bins of 512÷8=64.

In some embodiments, the constraint on the regular bins for a subblock is computed by multiplying a default constraint value by a factor. (The default constraint in the example of FIG. 3 is 32.) The factor is related to a ratio computed as (the total number of subblocks in current TU)/(the number of subblock to be coded), or floor((the total number of subblocks in current TU)/(the number of subblock to be coded)), where floor(x) means to find the maximum integer value that smaller than or equal to x. In some embodiments, some predefined factor are specified. The predefined factor can be chosen from {4, 2, 1.5, 1.25, 1}, or other values based on power of two denominators that can be computed by left/right shift and add operations. Let the total number of subblocks in current TU be defined as A, and the number of subblock to be coded be defined as B. In one example, if B*4<=A, then the factor can be 4. Otherwise, if B*2<=A, then the factor can be 2. Otherwise, if B*3<=A*2, then the factor can be 1.5. Otherwise, if B*5<=A*4, then the factor can be 1.25. Otherwise, the factor can be 1. In another example, if B*4<=A, then the factor can be 4. Otherwise, if B*3<=A, then the factor can be 3. Otherwise, if B*2<=A, then the factor can be 2. Otherwise, if B*3<=A*2, then the factor can be 1.5. Otherwise, if B*5<=A*4, then the factor can be 1.25. Otherwise, the factor can be 1. For different syntax type or different subblock size or different color component, the factor can be different.

III. Example Video Encoder

Figure 4:
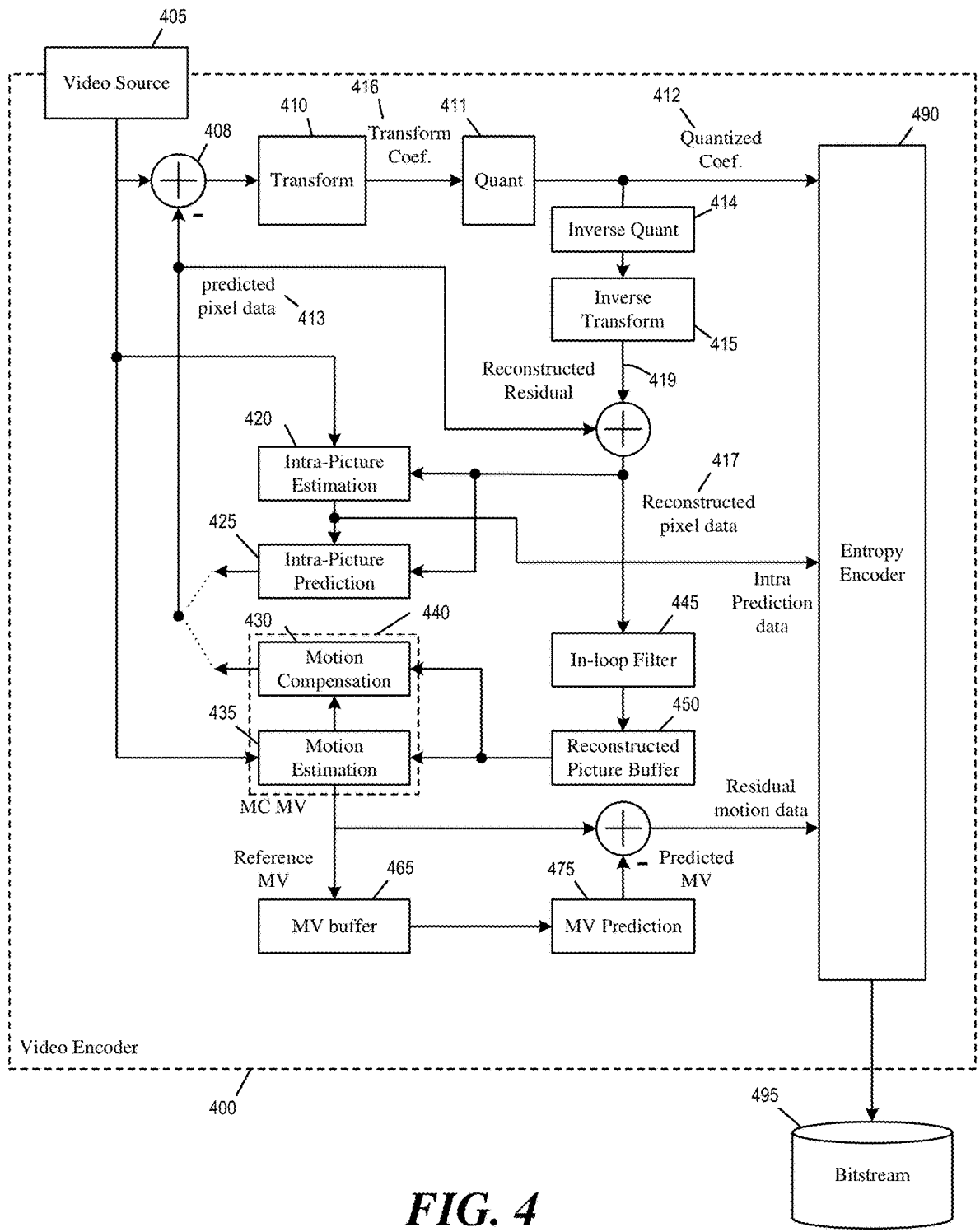
FIG. 4 illustrates an example video encoder.

FIG. 4 illustrates an example video encoder 400. As illustrated, the video encoder 400 receives input video signal from a video source 405 and encodes the signal into bitstream 495. The video encoder 400 has several components or modules for encoding the signal from the video source 405, at least including some components selected from a transform module 410, a quantization module 411, an inverse quantization module 414, an inverse transform module 415, an intra-picture estimation module 420, an intra-prediction module 425, a motion compensation module 430, a motion estimation module 435, an in-loop filter 445, a reconstructed picture buffer 450, a MV buffer 465, and a MV prediction module 475, and an entropy encoder 490. The motion compensation module 430 and the motion estimation module 435 are part of an inter-prediction module 440.

In some embodiments, the modules 410-490 are modules of software instructions being executed by one or more processing units (e.g., a processor) of a computing device or electronic apparatus. In some embodiments, the modules 410-490 are modules of hardware circuits implemented by one or more integrated circuits (ICs) of an electronic apparatus. Though the modules 410-490 are illustrated as being separate modules, some of the modules can be combined into a single module.

The video source 405 provides a raw video signal that presents pixel data of each video frame without compression. A subtractor 408 computes the difference between the raw video pixel data of the video source 405 and the predicted pixel data 413 from the motion compensation module 430 or intra-prediction module 425. The transform module 410 converts the difference (or the residual pixel data or residual signal 409) into transform coefficients (e.g., by performing Discrete Cosine Transform, or DCT). The quantization module 411 quantizes the transform coefficients into quantized data (or quantized coefficients) 412, which is encoded into the bitstream 495 by the entropy encoder 490.

The inverse quantization module 414 de-quantizes the quantized data (or quantized coefficients) 412 to obtain transform coefficients, and the inverse transform module 415 performs inverse transform on the transform coefficients to produce reconstructed residual 419. The reconstructed residual 419 is added with the predicted pixel data 413 to produce reconstructed pixel data 417. In some embodiments, the reconstructed pixel data 417 is temporarily stored in a line buffer (not illustrated) for intra-picture prediction and spatial MV prediction. The reconstructed pixels are filtered by the in-loop filter 445 and stored in the reconstructed picture buffer 450. In some embodiments, the reconstructed picture buffer 450 is a storage external to the video encoder 400. In some embodiments, the reconstructed picture buffer 450 is a storage internal to the video encoder 400.

The intra-picture estimation module 420 performs intra-prediction based on the reconstructed pixel data 417 to produce intra prediction data. The intra-prediction data is provided to the entropy encoder 490 to be encoded into bitstream 495. The intra-prediction data is also used by the intra-prediction module 425 to produce the predicted pixel data 413.

The motion estimation module 435 performs inter-prediction by producing MVs to reference pixel data of previously decoded frames stored in the reconstructed picture buffer 450. These MVs are provided to the motion compensation module 430 to produce predicted pixel data.

Instead of encoding the complete actual MVs in the bitstream, the video encoder 400 uses MV prediction to generate predicted MVs, and the difference between the MVs used for motion compensation and the predicted MVs is encoded as residual motion data and stored in the bitstream 495.

The MV prediction module 475 generates the predicted MVs based on reference MVs that were generated for encoding previously video frames, i.e., the motion compensation MVs that were used to perform motion compensation. The MV prediction module 475 retrieves reference MVs from previous video frames from the MV buffer 465. The video encoder 400 stores the MVs generated for the current video frame in the MV buffer 465 as reference MVs for generating predicted MVs.

The MV prediction module 475 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 495 by the entropy encoder 490.

The entropy encoder 490 encodes various parameters and data into the bitstream 495 by using entropy-coding techniques such as context-adaptive binary arithmetic coding (CABAC) or Huffman encoding. The entropy encoder 490 encodes various header elements, flags, along with the quantized transform coefficients 412, and the residual motion data as syntax elements into the bitstream 495. The bitstream 495 is in turn stored in a storage device or transmitted to a decoder over a communications medium such as a network.

The in-loop filter 445 performs filtering or smoothing operations on the reconstructed pixel data 417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 5:
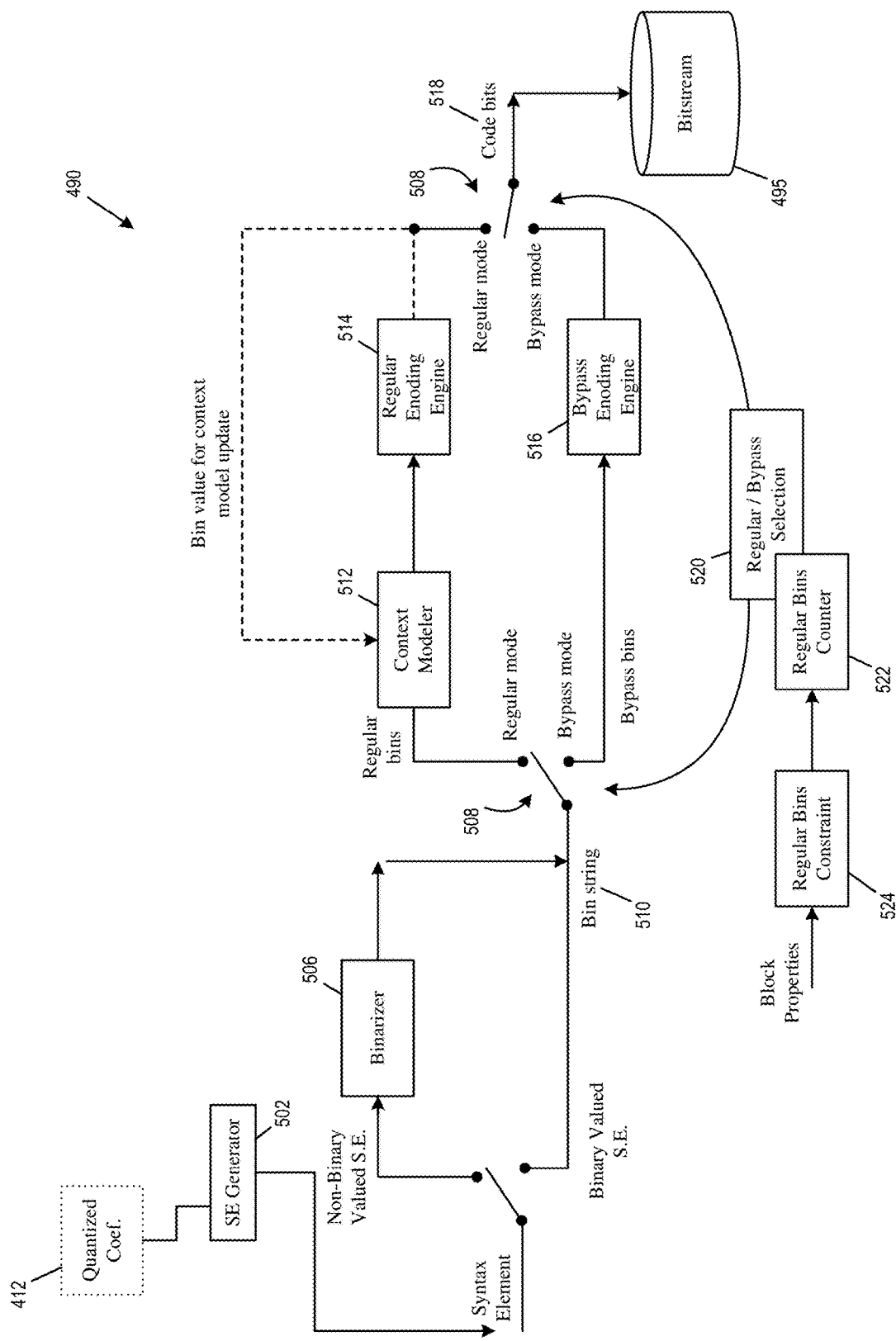
FIG. 5 illustrates portions of the video encoder that selectively entropy encodes syntax elements of a subblock of a block in either regular mode or bypass mode based on a constraint that limits the number of regular bins used for the subblock.

FIG. 5 illustrates portions of the video encoder 400 that selectively entropy encodes syntax elements of a subblock of a block in either regular mode or bypass mode based on a constraint that limits the number of regular bins used for the subblock. The figure illustrates the components of the entropy encoder module 490.

A syntax element generator 502 generates syntax elements to be entropy coded, including syntax elements that represent transform coefficients of the current subblock that are based on the quantized coefficients 412. The syntax elements are generated according to predetermined coding passes (e.g., sig_flag, gt1_flag, gt2_flag, and par_flag in a first coding pass).

The selected syntax elements are converted into bin strings 510 by the binarizer 506 (for non-binary valued syntax elements) or directly used as bin strings (for binary valued syntax elements). A regular/bypass mode switch 508 determines whether the syntax elements bin strings 510 are entropy coded as regular bins or bypass bins. Regular bins are processed by context modeler 512 and regular encoding engine 514 into code bits 518 using context modeling. Bypass bins are processed by bypass encoding engine 516 into code bits 518 without using context modeling. The code bits 518 are stored as part of the bitstream 495.

The regular/bypass mode switch 508 is controlled by a regular/bypass mode selection module 520. The regular/bypass mode selection module makes its decision as to whether to select regular mode or bypass mode by using a regular bins counter 522. The regular bins counter 522 counts the number of regular bins that are encoded for the current subblock, and the regular/bypass mode switch 508 allows bin string to be encoded as regular bins as long as the regular bins counter is not larger or equal to a constraint 524. Thus, the constraint 524 limits the number of regular bins for the current subblock or the current coding pass of the current subblock. The constraint 524 may be determined based on the size of the subblock, number of coded subblock in the current block, total number of subblock in the current block, color component of the current subblock, or other properties of the current block or subblock.

Figure 6:
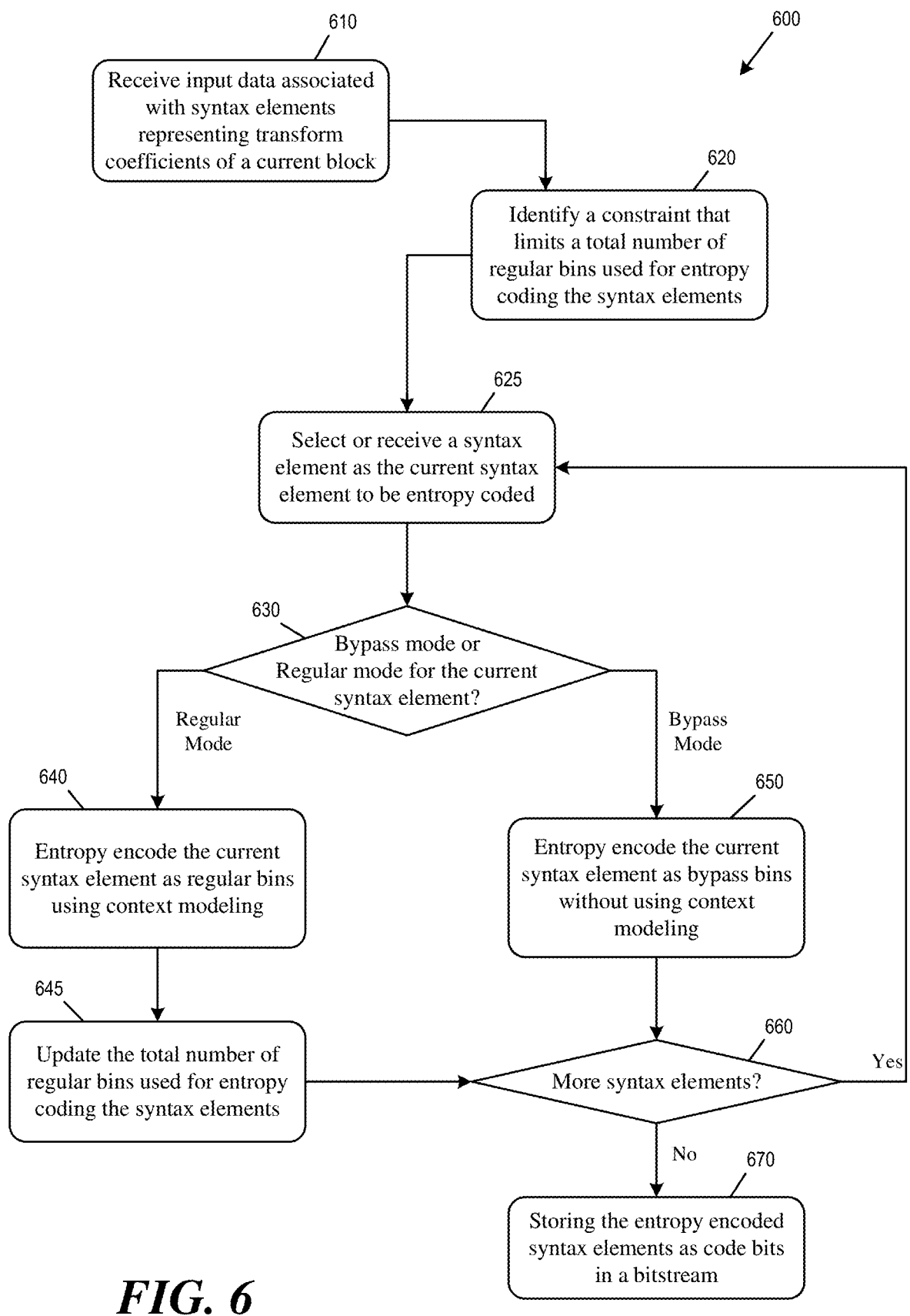
FIG. 6 conceptually illustrates a process that selectively entropy encodes syntax elements of a subblock of a block in either regular mode or bypass mode based on a constraint that limits the number of regular bins used for the subblock.

FIG. 6 conceptually illustrates a process 600 that selectively entropy encodes syntax elements of a current block in either regular mode or bypass mode based on a constraint that limits the number of regular bins used for a transform block. In some embodiments, one or more processing units (e.g., a processor) of a computing device implementing the video encoder 400 performs the process 600 by executing instructions stored in a computer readable medium. In some embodiments, an electronic apparatus implementing the video encoder 400 performs the process 600.

The video encoder receives (at step 610) input data associated with syntax elements representing transform coefficients of a current block. The transform coefficients may be that of a transform block of the current block, or that of a subblock of the transform block. In some embodiments, the syntax elements are to be entropy encoded in multiple coding passes. For each transform coefficient, at least a first flag, a second flag, and a third flag indicating an absolute value of the transform coefficient are to be entropy encoded in a first coding pass. The first flag may indicate whether an absolute value of the transform coefficient level is greater than 0 (e.g., sig_flag). The second flag may indicate whether the absolute value of the transform coefficient level is greater than 1 (e.g., gt1_flag). The third flag may indicate whether the absolute value of the transform coefficient level is greater than 2 or 3 (e.g., gt2_flag). In some embodiments, a parity of the absolute value of the transform coefficient (e.g., par_flag) is also entropy coded in the first coding pass, while a remainder of the transform coefficient is entropy coded in a second coding pass, and a sign of the transform coefficient is entropy coded in a third coding pass. The regular bins of the transform coefficient are entropy coded in the first coding pass by using a context model that is determined based on the first flag, the second flag, the third flag, and the parity of the absolute value of the transform coefficient.

The video encoder identifies (at step 620) a constraint that limits a total number of regular bins used for entropy encoding the syntax elements. In some embodiments, the constraint is different for a first color component than for a second color component. In some embodiments, the constraint is determined based on the size of the transform block. In some embodiments, the constraint is computed by multiplying a default constraint with a predefined factor that is derived from a ratio of a number of coded subblocks in the current block and a number of all subblocks in the current block. In some embodiments, a total number of regular bins used for entropy coding the syntax elements in the first coding pass is limited by the constraint. In some embodiments, there is no constraint limiting a number of regular bins that is specific to an individual syntax element.

The video encoder selects or receives (at step 625) a syntax element as the current syntax element to be entropy encoded. The selection of the syntax element may be determined by the current coding pass. The video encoder then determines (at step 630) whether to use bypass mode or regular mode for encoding a current syntax element. In some embodiments, the video decoder keeps track of the number or the count of regular bins that have already been used for encoding the syntax elements. The number of regular bins is compared with the constraint identified in the step 620, which limits a maximum allowed number of CABAC regular bins for the transform block, e.g., the maximum allowed numbers of CABAC regular bins for coding a subblock. If encoding the current syntax element as regular bins will exceed the constraint, the process proceeds to 650. If encoding the current syntax element as regular bins will not exceed the constraint, the process proceeds 640. In some embodiments, the video coder may code certain syntax elements as regular bins regardless of the constraint.

At step 640, the video encoder entropy encodes the current syntax element as regular bins using context modeling. The video encoder also updates (at step 645) the total number or count of regular bins used for entropy coding the syntax elements. The process 600 then proceeds to 660.

At step 650, the video encoder entropy encodes the current syntax element as bypass bins without using context modeling. The process then proceeds to 660.

At step 660, the video encoder determines whether there are more syntax elements to be entropy encoded for the current transform block, the current subblock, or for the current coding pass. If so, the process returns to step 625 to entropy encode more syntax elements. Otherwise, the process proceeds to 670 to store the entropy encoded syntax elements as code bits in a bitstream.

IV. Example Video Decoder

Figure 7:
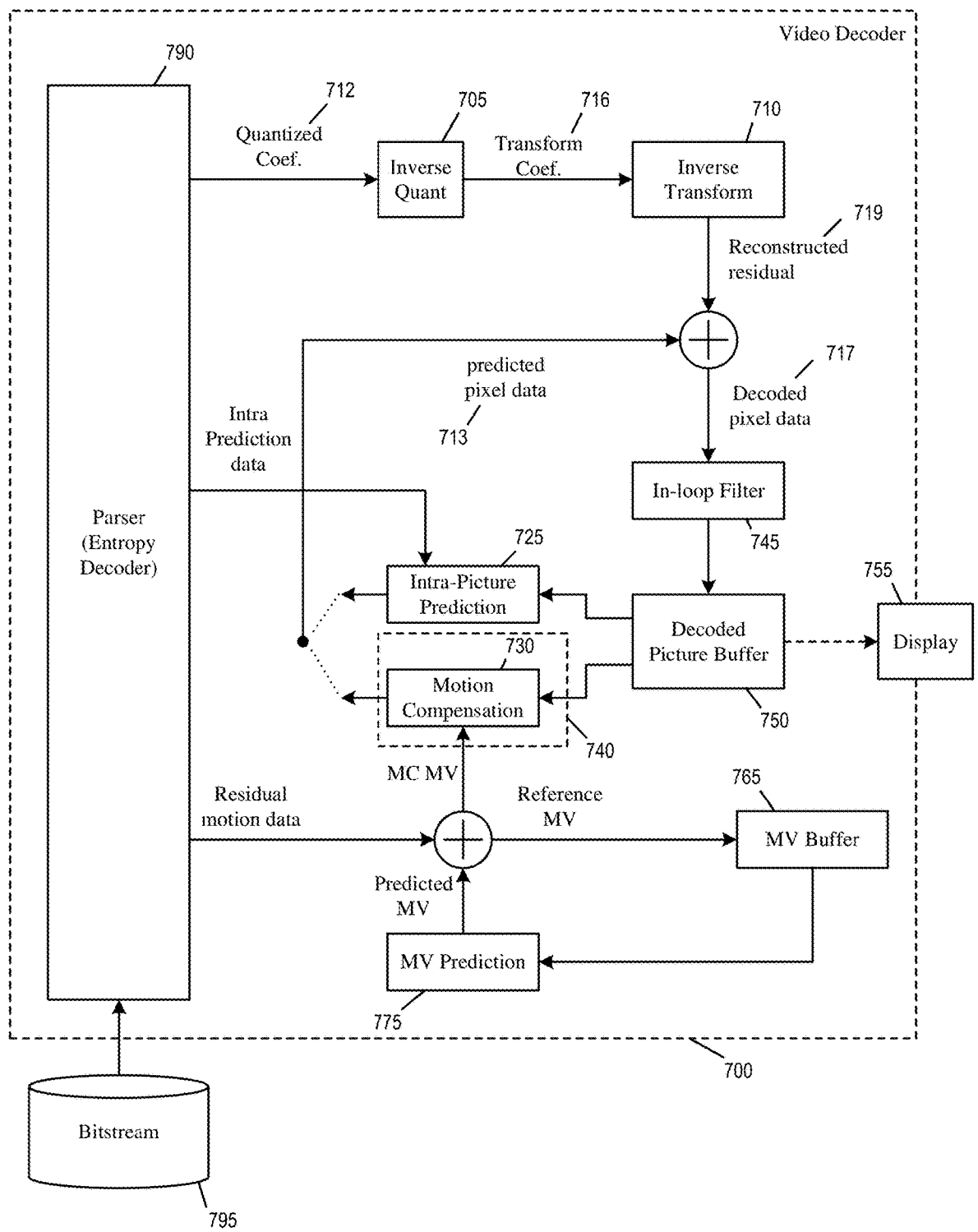
FIG. 7 illustrates an example video decoder.

FIG. 7 illustrates an example video decoder 700. As illustrated, the video decoder 700 is an image-decoding or video-decoding circuit that receives a bitstream 795 and decodes the content of the bitstream into pixel data of video frames for display. The video decoder 700 has several components or modules for decoding the bitstream 795, including some components selected from an inverse quantization module 705, an inverse transform module 710, an intra-prediction module 725, a motion compensation module 730, an in-loop filter 745, a decoded picture buffer 750, a MV buffer 765, a MV prediction module 775, and a parser 790. The motion compensation module 730 is part of an inter-prediction module 740.

In some embodiments, the modules 710-790 are modules of software instructions being executed by one or more processing units (e.g., a processor) of a computing device. In some embodiments, the modules 710-790 are modules of hardware circuits implemented by one or more ICs of an electronic apparatus. Though the modules 710-790 are illustrated as being separate modules, some of the modules can be combined into a single module.

The parser 790 (or entropy decoder) receives the bitstream 795 and performs initial parsing according to the syntax defined by a video-coding or image-coding standard. The parsed syntax element includes various header elements, flags, as well as quantized data (or quantized coefficients) 712. The parser 790 parses out the various syntax elements by using entropy-coding techniques such as context-adaptive binary arithmetic coding (CABAC) or Huffman encoding.

The inverse quantization module 705 de-quantizes the quantized data (or quantized coefficients) 712 to obtain transform coefficients, and the inverse transform module 710 performs inverse transform on the transform coefficients 716 to produce reconstructed residual signal 719. The reconstructed residual signal 719 is added with predicted pixel data 713 from the intra-prediction module 725 or the motion compensation module 730 to produce decoded pixel data 717. The decoded pixels data are filtered by the in-loop filter 745 and stored in the decoded picture buffer 750. In some embodiments, the decoded picture buffer 750 is a storage external to the video decoder 700. In some embodiments, the decoded picture buffer 750 is a storage internal to the video decoder 700.

The intra-prediction module 725 receives intra-prediction data from bitstream 795 and according to which, produces the predicted pixel data 713 from the decoded pixel data 717 stored in the decoded picture buffer 750. In some embodiments, the decoded pixel data 717 is also stored in a line buffer (not illustrated) for intra-picture prediction and spatial MV prediction.

In some embodiments, the content of the decoded picture buffer 750 is used for display. A display device 755 either retrieves the content of the decoded picture buffer 750 for display directly or retrieves the content of the decoded picture buffer to a display buffer. In some embodiments, the display device receives pixel values from the decoded picture buffer 750 through a pixel transport.

The motion compensation module 730 produces predicted pixel data 713 from the decoded pixel data 717 stored in the decoded picture buffer 750 according to motion compensation MVs (MC MVs). These motion compensation MVs are decoded by adding the residual motion data received from the bitstream 795 with predicted MVs received from the MV prediction module 775.

The MV prediction module 775 generates the predicted MVs based on reference MVs that were generated for decoding previous video frames, e.g., the motion compensation MVs that were used to perform motion compensation. The MV prediction module 775 retrieves the reference MVs of previous video frames from the MV buffer 765. The video decoder 700 stores the motion compensation MVs generated for decoding the current video frame in the MV buffer 765 as reference MVs for producing predicted MVs.

The in-loop filter 745 performs filtering or smoothing operations on the decoded pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
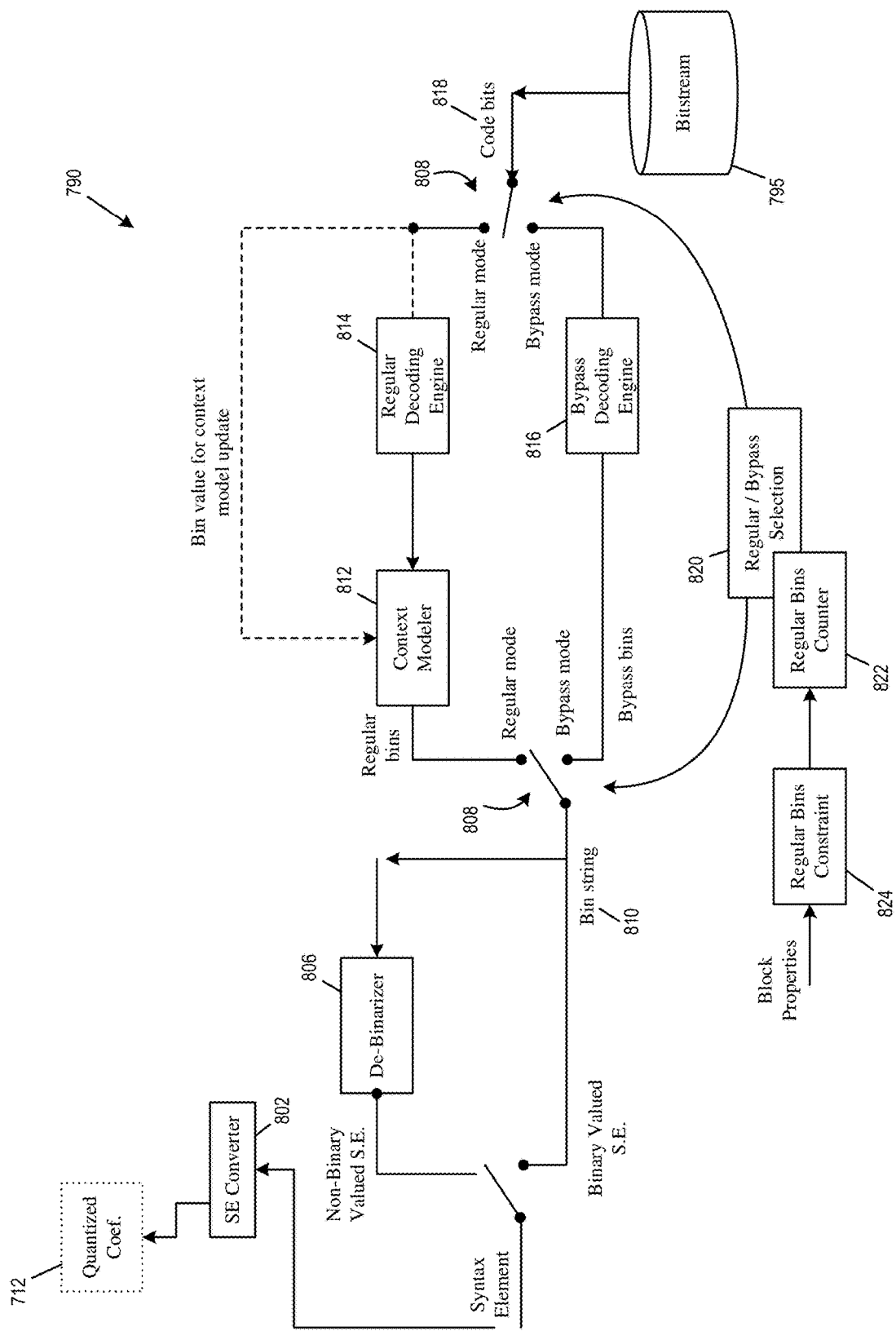
FIG. 8 illustrates portions of the video decoder that selectively entropy decodes syntax elements of a subblock of a block in either regular mode or bypass mode based on a constraint that limits the number of regular bins used for the subblock.

FIG. 8 illustrates portions of the video decoder 700 that selectively entropy decodes syntax elements of a subblock of a block in either regular mode or bypass mode based on a constraint that limits the number of regular bins used for the subblock. The figure illustrates the components of the entropy decoder module 790.

The entropy decoder 790 receives code bits 818 from the bitstream 795. A regular/bypass mode switch 808 determines whether the code bits are to be decoded as regular bins or bypass bins. Code bits that are to be decoded as regular bins are processed by context modeler 812 and a regular decoding engine 814 into bin strings 810 using context modeling. Code bits that are to be decoded as bypass bins are processed by a bypass coding engine 816 into bin strings 810 without using context modeling.

The bin strings 810 are converted into syntax elements by the de-binarizer 806 (for non-binary valued syntax elements) or directly used as syntax elements (for binary valued syntax elements). A syntax element converter 802 converts the syntax elements into signals or values to be used by various parts of the video decoder 700, including converting syntax elements of transform coefficient (e.g., sig_flag, gt1_flag, gt2_flag, and par_flag) into quantized coefficients 712 for the inverse quantizer 705. Syntax elements are converted according to their orderings specified by predetermined coding passes.

The regular/bypass mode switch 808 is controlled by a regular/bypass mode selection module 820. The regular/bypass mode selection module makes its decision as to whether to select regular mode or bypass mode by using a regular bins counter 822. The regular bins counter 822 counts the number of regular bins that are decoded for the current subblock, and the regular/bypass mode switch 808 allows code bits to be decoded as regular bins as long as the regular bins counter is not larger or equal to a constraint 824. Thus, the constraint 824 limits the number of regular bins for the current subblock or the current coding pass of the current subblock. The constraint 824 may be determined based on the size of the subblock, number of coded subblock in the current block, total number of subblock in the current block, color component of the current subblock, or other properties of the current block and subblock.

Figure 9:
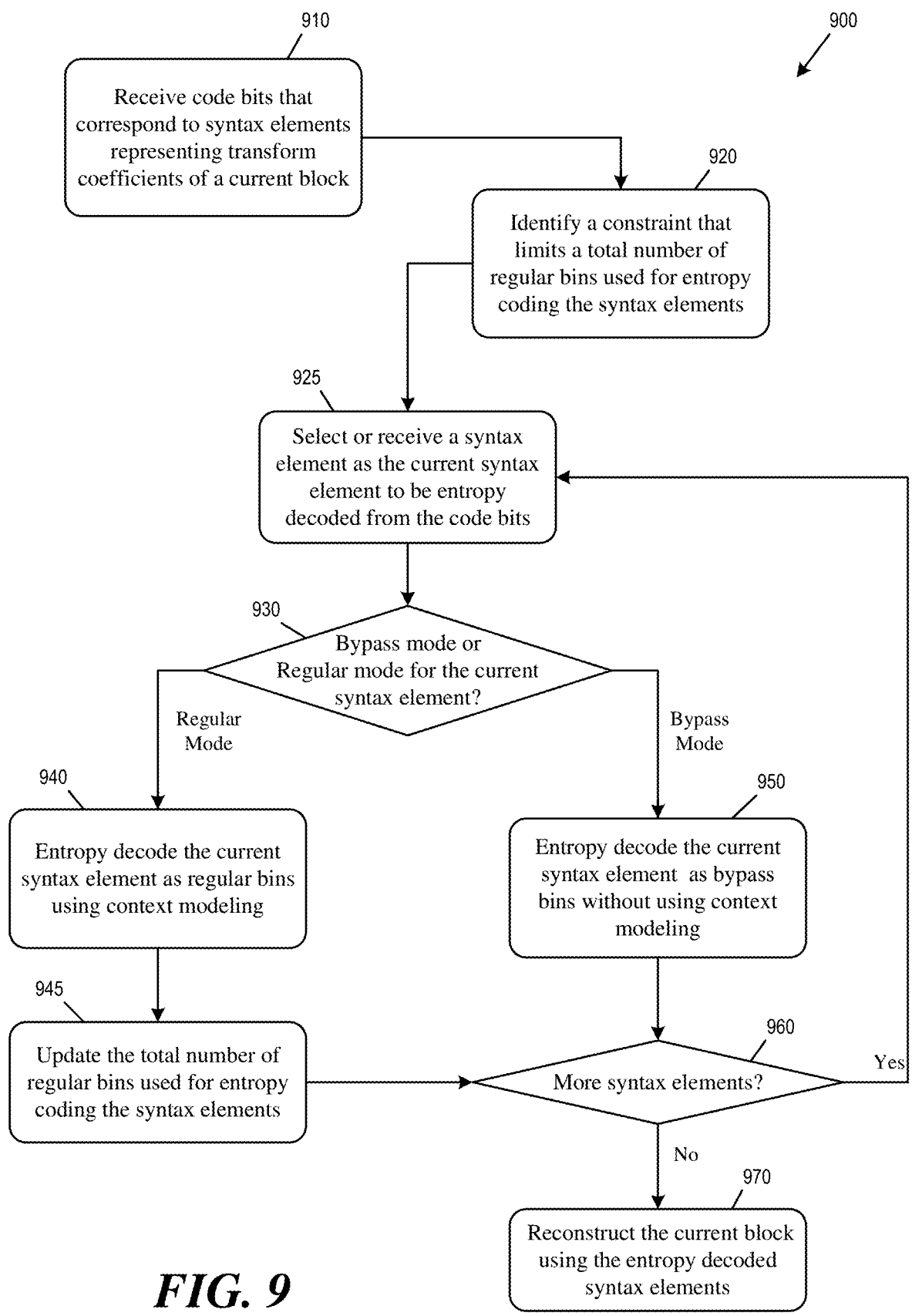
FIG. 9 conceptually illustrates a process that selectively entropy decodes syntax elements of a subblock of a block in either regular mode or bypass mode based on a constraint that limits the number of regular bins used for the subblock.

FIG. 9 conceptually illustrates a process 900 that selectively entropy decodes syntax elements of a subblock of a block in either regular mode or bypass mode based on a constraint that limits the number of regular bins used for a transform block. In some embodiments, one or more processing units (e.g., a processor) of a computing device implementing the video decoder 700 performs the process 900 by executing instructions stored in a computer readable medium. In some embodiments, an electronic apparatus implementing the video decoder 700 performs the process 900.

The video decoder receives (at step 910) code bits from a bitstream that correspond to a plurality of syntax elements representing transform coefficients of a current block. The transform coefficients may be that of a transform block of the current block, or that of a subblock of the transform block. In some embodiments, the syntax elements are to be entropy decoded in multiple coding passes. For each transform coefficient, at least a first flag, a second flag, and a third flag indicating an absolute value of the transform coefficient are to be entropy decoded in a first coding pass. The first flag may indicate whether an absolute value of the transform coefficient level is greater than 0 (e.g., sig_flag). The second flag may indicate whether the absolute value of the transform coefficient level is greater than 1 (e.g., gt1_flag). The third flag may indicate whether the absolute value of the transform coefficient level is greater than 2 or 3 (e.g., gt2_flag). In some embodiments, a parity of the absolute value of the transform coefficient (e.g., par_flag) is also entropy coded in the first coding pass, while a remainder of the transform coefficient is entropy coded in a second coding pass, and a sign of the transform coefficient is entropy coded in a third coding pass. The regular bins of the transform coefficient are entropy coded in the first coding pass by using a context model that is determined based on the first flag, the second flag, the third flag, and the parity of the absolute value of the transform coefficient.

The video decoder identifies (at step 920) a constraint that limits a total number of regular bins used for entropy decoding the syntax elements. In some embodiments, the constraint is different for a first color component than for a second color component. In some embodiments, the constraint is determined based on a size of the transform block. In some embodiments, the constraint is computed by multiplying a default constraint with a predefined factor that is derived from a ratio of a number of coded subblocks in the current block and a number of all subblocks in the current block. In some embodiments, a total number of regular bins used for entropy decoding the syntax elements in the first coding pass is limited by the constraint. In some embodiments, there is no constraint limiting a number of regular bins that is specific to an individual syntax element.

The video decoder selects or receives (at step 925) a syntax element as the current syntax element to be entropy decoded from the code bits of the bitstream. The selection of the syntax element may be determined by the current coding pass. The video decoder then determines (at step 930) whether to use bypass mode or regular mode for decoding a current syntax element. In some embodiments, the video decoder keeps track of the number or the count of regular bins that have already been used for decoding the syntax elements. The number of regular bins is compared with the constraint identified in step 920, which limits a maximum allowed number of CABAC regular bins for the transform block, e.g., the maximum allowed numbers of CABAC regular bins for coding a subblock.

If decoding the current syntax element as regular bins will exceed the constraint, the process proceeds to 950. If decoding the current syntax element as regular bins will not exceed the constraint, the process proceeds 940. In some embodiments, the video coder may decode certain syntax elements as regular bins regardless of the constraint.

At step 940, the video decoder entropy decodes the current syntax element as regular bins using context modeling. The video decoder also updates (at step 945) the total number or count of regular bins used for entropy decoding the syntax elements. The process 900 then proceeds to 960.

At step 950, the video decoder entropy decodes the current syntax element as bypass bins without using context modeling. The process then proceeds to 960.

At step 960, the video decoder determines whether there are more syntax elements for the current subblock or the current coding pass of the current subblock to be entropy decoded. If so, the process returns to step 925 to entropy decode more syntax elements. Otherwise, the process proceeds to 970 to reconstruct the current block using entropy decoded syntax elements such as transform coefficients.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs. In some embodiments, a coding operation means an encoding operation or a decoding operation.

Figure 10:
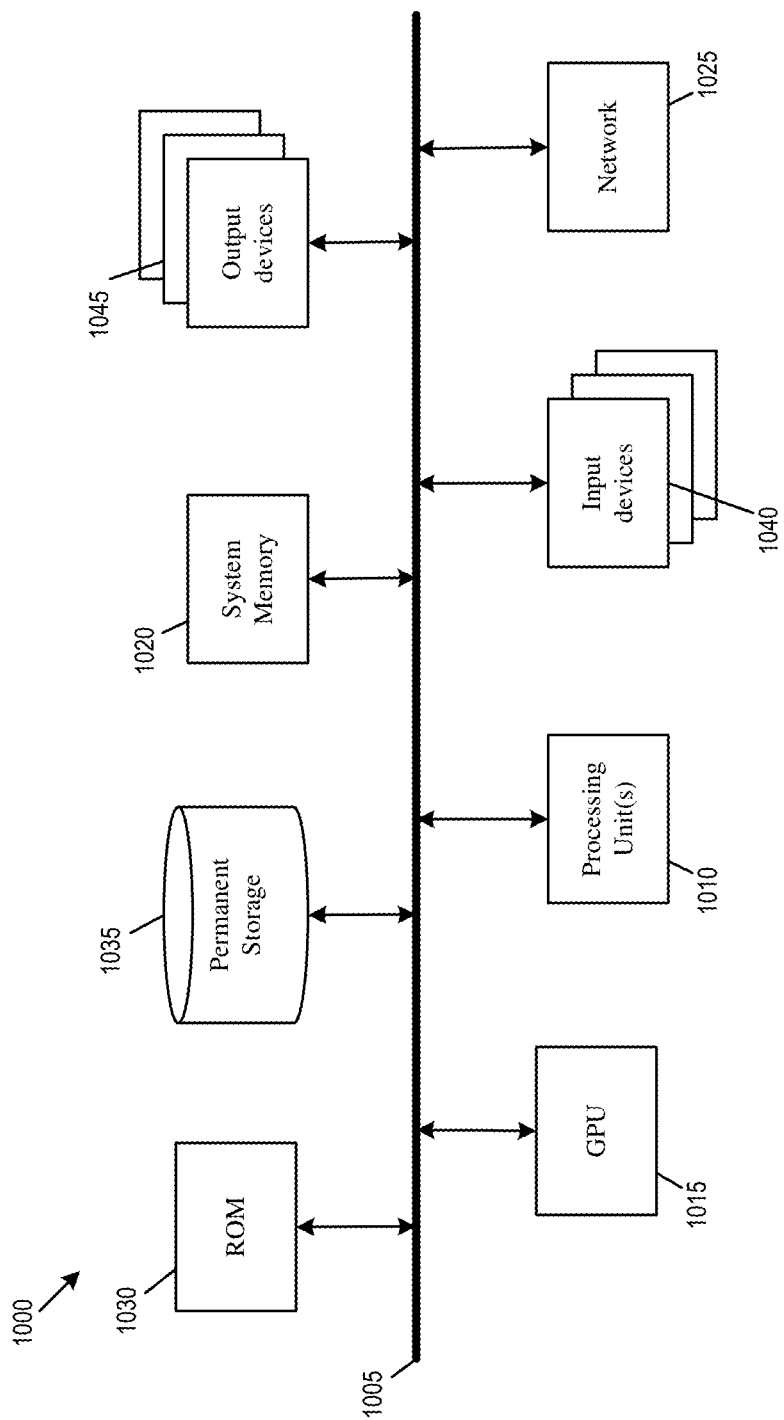
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 6 and FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:

receiving input data associated with a plurality of syntax elements representing transform coefficients of a current block; and entropy coding the plurality of syntax elements selectively as either regular bins using context modeling or as bypass bins without context modeling, wherein a number of the regular bins used for entropy coding the plurality of syntax elements representing transform coefficients of a transform block is limited by a constraint, wherein the constraint limiting the number of the regular bins is determined based on a size of the transform block and a basic termination threshold that is less than or equal to 32 per 4×4 sub-block, or equivalently is less than equal to 2 per sample, wherein the current block is divided into one or more subblocks that are entropy coded according to a specified scan order, wherein the plurality of syntax elements in each of the one or more subblocks are coded in a plurality of coding passes, and the syntax elements in a first coding pass are all coded using regular bins and a total number of the regular bins used for entropy coding the syntax elements in the first coding pass is limited by the constraint and the syntax elements in other coding passes are all coded using bypass bins, and wherein when an accumulated number of used regular bins from the coded transform coefficients in the current block is greater than the constraint for a current transform coefficient, the first coding pass is skipped for a current transform coefficient of the current block, remaining transform coefficients of the current block, and all transform coefficients of remaining uncoded subblocks.

2. The method of claim 1, wherein an absolute value for a transform coefficient is indicated by one or more of a first flag, a second flag, and a third flag that are entropy coded in the first coding pass, and wherein:
the first flag indicates whether an absolute value of the transform coefficient is greater than 0,
the second flag indicates whether the absolute value of the transform coefficient is greater than 1, and
the third flag indicates whether the absolute value of the transform coefficient is greater than 3.

3. The method of claim 2, wherein:
a syntax flag for indicating a parity of the absolute value of the transform coefficient is entropy coded in the first coding pass,
a remainder of the transform coefficient is entropy coded in a second coding pass, and
a sign of the transform coefficient is entropy coded in a third coding pass.

4. The method of claim 3, wherein the regular bins of the first coding pass are entropy coded by using one or more context models that are dependent on one or more indicators of absolute values of one or more neighboring transform coefficients.

5. The method of claim 4, wherein at least one context model for entropy coding the first flag or the second flag is selected conditioned on a value of the third flag.

6. The method of claim 1, wherein the constraint limiting the number of the regular bins is different for a first color component than for a second color component.

7. The method of claim 1, wherein the constraint limiting the number of the regular bins is computed by multiplying a default constraint having a first value with a predefined factor that is derived from a ratio of a number of coded subblocks in the current block and a number of all subblocks in the current block.

8. The method of claim 1, wherein the number of the regular bins used for individual syntax elements present in a transform subblock or a transform subblock coding pass is not limited as long as the accumulated number of the used regular bins from the coded transform coefficients in the current block is not greater than the constraint for the current transform coefficient.

9. The method of claim 1, wherein the constraint limiting the number of the regular bins limits a number of regular bins used for a subblock of the current block.

10. An electronic apparatus comprising:
a decoder circuit capable of: receiving from a bitstream code bits that correspond to a plurality of syntax elements representing transform coefficients of a current block;
entropy decoding the code bits into the plurality of syntax elements selectively as either regular bins using context modeling or as bypass bins without context modeling, wherein a number of the regular bins used for entropy decoding the plurality of syntax elements representing transform coefficients of a transform block is limited by a constraint,
wherein the constraint limiting the number of the regular bins is determined based on a size of the transform block and a basic termination threshold that is less than or equal to 32 per 4×4 sub-block, or equivalently is less than equal to 2 per sample,
wherein the current block is divided into one or more subblocks that are entropy coded according to a specified scan order,
wherein the plurality of syntax elements in each of the one or more subblocks are coded in a plurality of coding passes, and the syntax elements in a first coding pass are all coded using regular bins and a total number of the regular bins used for entropy coding the syntax elements in the first coding pass is limited by the constraint and the syntax elements in other coding passes are all coded using bypass bins, and
wherein when an accumulated number of used regular bins from the coded transform coefficients in the current block is greater than the constraint for a current transform coefficient, the first coding pass is skipped for a current transform coefficient of the current block, remaining transform coefficients of the current block, and all transform coefficients of remaining encoded subblocks; and
reconstructing the current block using the entropy decoded syntax elements.

11. An electronic apparatus comprising:
an encoder circuit capable of receiving a plurality of syntax elements representing transform coefficients of a current block;
entropy encoding the plurality of syntax elements selectively as either regular bins using context modeling or as bypass bins without context modeling, wherein a number of the regular bins used for entropy encoding the plurality of syntax elements representing transform coefficients of a transform block is limited by a constraint,
wherein the constraint limiting the number of the regular bins is determined based on a size of the transform block and a basic termination threshold that is less than or equal to 32 per 4×4 sub-block, or equivalently is less than equal to 2 per sample,
wherein the current block is divided into one or more subblocks that are entropy coded according to a specified scan order,
wherein the plurality of syntax elements in each of the one or more subblocks are coded in a plurality of coding passes, and the syntax elements in a first coding pass are all coded using regular bins and a total number of the regular bins used for entropy coding the syntax elements in the first coding pass is limited by the constraint and the syntax elements in other coding passes are all coded using bypass bins, and
wherein when an accumulated number of used regular bins from the coded transform coefficients in the current block is greater than the constraint for a current transform coefficient, the first coding pass is skipped for a current transform coefficient of the current block, remaining transform coefficients of the current block, and all transform coefficients of remaining encoded subblocks; and
storing the entropy encoded syntax elements in a bitstream.

12. The method of claim 1, wherein the regular bins limited by the constraint are used for entropy coding the plurality of syntax elements present in the transform subblock or the transform subblock coding pass.

13. The method of claim 12, wherein the constraint limiting the number of the regular bins is a first constraint for a 2×2 transform subblock and a second constraint, which is different from the first constraint, for a 4×4 transform subblock.

* * * * *